May 13, 1969     K. M. OLIPHANT     3,444,083
ELECTROPHOTOGRAPHIC TONERS

Original Filed Feb. 16, 1962

INVENTOR
KEITH MERIDITH OLIPHANT
BY
Wallace, Kinzer & Dorn
ATTORNEYS

United States Patent Office 3,444,083
Patented May 13, 1969

3,444,083
ELECTROPHOTOGRAPHIC TONERS
Keith Meridith Oliphant, Westbourne Park, South Australia, Australia, assignor to Research Laboratories of Australia Limited, Adelaide, South Australia, Australia
Continuation of application Ser. No. 195,064, Feb. 16, 1962. This application Sept. 19, 1966, Ser. No. 580,499
Int. Cl. G03g 9/00
U.S. Cl. 252—62.1         3 Claims

ABSTRACT OF THE DISCLOSURE

Electrostatic images are developed using a liquid developer presenting pigment particles coated with an agent having wetting properties with respect to a fixing agent, the fixing agent being soluble in a carrier liquid which is part of the developer.

---

Figure 1:
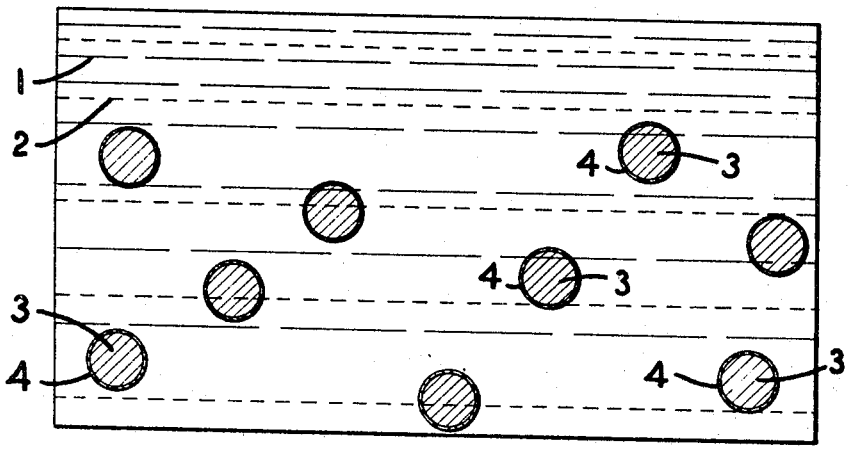

This application is a continuation of application S.N. 195,064, filed Feb. 16, 1962, now abandoned.

Previously most satisfactory liquid dispersible toners for electrophotography have consisted of pigment coated with control and fixing resins or oils. In some instances control and fixing functions have been confined to one material. In such systems the control agent needs to be insoluble in the carrier liquid while the fixing agent, which adheres or bonds the coloring particles to the charged image thereby rendering the coloring particles fast, is at least softened by the carrier liquid. In actual fact this usually introduces problems of compatibility of the two materials with each other and the carrier liquid.

Secondly, the toner or coloring particles in suspension tend toward electrical and chemical equilibrium with the carrier liquid in time. That is, the effectiveness of the toner decreases with time until it ceases to function as an electrophotographic developer. This occurs because the dissolution of fixing agent into the carrier liquid usually lowers the volume resistivity of the liquid to such an extent that eventually the liquid ceases to support the electrostatic charge. In addition the fixing properties of the toner particles are progressively impaired by loss of fixing agent.

It is therefore customary at the present time to prepare a developer paste and to suspend this in the carrier liquid just before development takes place, the shelf life of the mixed developer being thus relatively short.

The present invention is aimed at solving these problems, in that the control and fixing agents are not resins or the like incompatible with each other and the toner suspension in the carrier liquid is not subject to electrical and chemical deterioration during storage or use.

This is achieved by selecting pigment particles, or particles which can be pigmented, in such a way that either by themselves or by use of a coating agent these particles have an affinity for the fixing agent which for the purpose of this invention is held in solution. The fixing agent is, however, attracted to the particles and in this way the action is to reduce the amount of free fixing agent in the carrier liquid or to adsorb it on to the particles but in dissolved form.

In this way a very stable developer results in which the fixing medium is held to the particles and deterioration of the carrier liquid thus does not take place.

According to the preferred form, the present invention envisages the use of a coating agent for the pigment, such coating agent being so chosen that it exhibits control properties on the magnitude and polarity of the surface charge on the particles, and also allows adsorption of fixing agent from the carrier liquid on to the toner particles, this equilibrium position or state being reached very quickly on dispersion, and deterioration of the developer during storage and use thus being eliminated.

Generally but not necessarily the coating agents employed with the common pigments are surfactants, such as water, water solutions of coating agents such as sulphonated castor oil, dilute organic and inorganic acids, dilute inorganic bases, alcohols, ketones, cyclic hydrocarbons, aromatic hydrocarbons, chlorinated hydrocarbons, and the like.

In order to carry out the invention, the chosen pigment is wetted with the chosen wetting agent, any excess wetting agent being removed by decanting or filtration, so that the carrier liquid will be devoid of or uncontaminated by the coating agent, and the resultant paste is diluted either with a portion of the carrier liquid, or with an insulating liquid compatible with the carrier liquid such as cumene, tetrahydronaphthalene, cyclohexane and the like. The fixing agent to be used is then dissolved or dispersed in the carrier liquid and the coated pigment added with vigorous stirring or milling. The resultant suspension contains controlled toner particles with adsorbed fixing agent, and assumes its stable equilibrium state immediately. The carrier liquid can be any from the range of non-polar and relatively non-polar liquids such as aliphatic hydrocarbons hexane, heptane, octane and the like, the chlorinated hydrocarbons perchloroethylene and carbon tetrachloride, certain aromatic hydrocarbons such as benzene and toluene, the chlorinated fluorinated hydrocarbons, alkanes, or mixtures of these. The preferred carrier liquids consist of mixture of perchloroethylene with hydrocarbons n-heptane, n-hexane, iso-octane, benzene and Esso Petroleum Co. Solvesso 100. Materials suitable for use as fixing agents and dispersible in the carrier liquids include polystyrene, rubber latex, lithographic varnish, ester gum, stearin, beeswax, carnauba wax, polymerised linseed oil, raw linseed oil, alkyd resins, epoxy ester resins, acrylic alkyd resins, maleic resins, natural gums such as damar, dragons blood, elemi and the like.

In addition the toner or coloring particles may be the transparent materials normally used as extenders such as alumina hydrate, which are coloured to the correct transparent shade by the insertion of a dye into a coating agent which is soluble in the coating agent, and this dye is adsorbed on the toner particle to produce a transparent controlled colour of the desired particle size in the developer suspension. As an example the dye Victoria blue can be dissolved in butyl alcohol which is then used to wet alumina hydrate and thus produce a controlled transparent blue pigment. Permanent or fleeting dye can be used as desired.

So that the invention may be fully understood a description will now be made with reference to the accompanying drawings in which the theoretical basis of the preferred form of the invention is illustrated.

Figure 2:
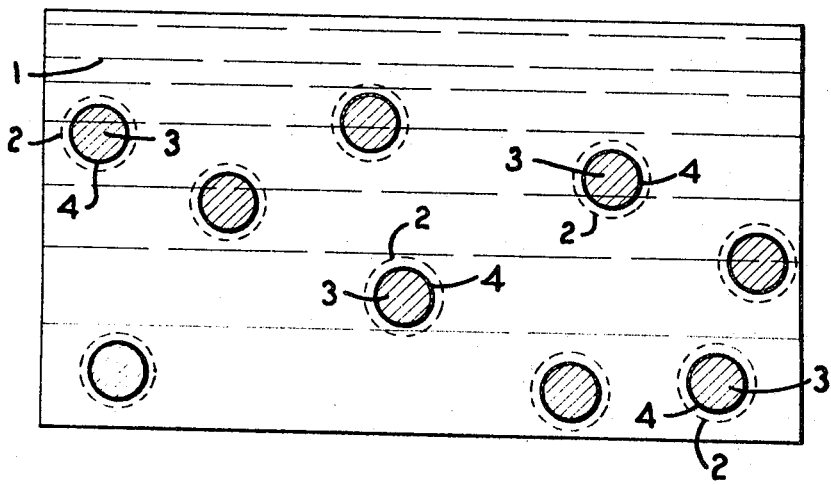

FIG. 1 is a schematic view indicating the carrier liquid and the bonding medium and showing the toner particles therein with their surrounding of coating agent, the condition shown being that where the toner particles are first placed into the carrier liquid, and FIG. 2 is a view corresponding to FIG 1 but showing the condition after a time interval where it will be seen that the bonding medium that is, the fixing agent, still in the form of a solution, has been drawn around the toner particles by the coating agent to leave the carrier liquid free of the bonding medium.

In the illustrations the carrier liquid is designated 1 while 2 indicates the dissolved bonding medium, the toner particles being designated 3 while the wetting agent surrounding the toner particles is designated 4.

As previously stated, the carrier liquid acts as a solvent for the resin or similar bonding medium, the toner particles however being unaffected by either of these liquids but having been pre-coated with the coating agents so that in their suspended form in the carrier liquid they have an envelope of the coating agent 4 and are therefore in a condition where they can adsorb the liquid bonding medium and remove its influence from the carrier liquid itself.

It will therefore be obvious that when the toner particles with their coating of coating agent are suspended in the compound liquid, they will gradually separate the dissolved bonding medium gradually being drawn around the toner particles, and a separation of the two liquid phases will thus result. As this action will continue indefinitely, obviously there will be no contamination of the carrier liquid by the fixing phase and therefore no lowering of the electrical volume resistivity of the carrier liquid.

This then ensures that the ready mixed developer will have a long life and can be stored over substantial periods without any deterioration.

As the carrier phase liquid is evaporated after deposition of the toner particles with their surrounding coating agent and the attached liquid phase bonding medium, the particles will be fixed in position on the surface on which they are to be deposited because the evaporation of the carrier liquid, which acted as the solvent for the resin or other bonding medium, will bring the resin or other bonding medium back into solid form and this action will automatically then provide the film which will bond the toner particles to the surface on which they are deposited.

As examples of the way in which the invention can be carried out the following will serve to illustrate the invention.

EXAMPLE 1

| | | |
|---|---|---|
| Lithol red (pigment) | grams__ | 5 |
| Cumene (coating agent) | do____ | 5 |
| Perchlorethylene (carrier liquid) | ml__ | 100 |
| n-Heptane (carrier liquid) | ml__ | 100 |
| Polymerised linseed oil (fixing agent) | grams__ | 5 |

The polymerised linseed oil is dissolved in the carrier liquid and the pigment is then added with vigorous agitation. In this example the affinity of the pigment for the polymerised oil is increased by the cumene.

EXAMPLE 2

Tetrahydronaphthalene is substituted for the cumene in Example 1.

EXAMPLE 3

Dipentene is substituted for the cumene in Example 1 and acts as an odorant as well as a coating agent.

EXAMPLE 4

Petroleum jelly is substituted for the linseed oil of Example 1.

EXAMPLE 5

| | | |
|---|---|---|
| Carbon black (pigment) | grams__ | 10 |
| Iso-propylalcohol (wetting agent) | do____ | 50 |

These two are mixed together and the excess alcohol removed by decanting or filtering. Then 10 grams benzene is added to reduce the paste to a more easily worked consistency.

Then 20 grams polystyrene (fixing agent) are dissolved in 60 grams benzene, after solution is complete the polystyrene solution is diluted with 100 ml. perchlorethylene and 50 ml. n-heptane (carrier liquid). The wetted carbon black is added with vigorous stirring or milling, and the resultant liquid developer is a stable suspension, capable of giving a fixed, black, positive image on the zinc-oxide coated electrophotographic paper. This developer is more appropriate to line reproduction than to continuous tone work.

EXAMPLE 6

The carbon black isopropyl alcohol dispersion of Example 5 is suspended in a 5% solution of polymerised linseed oil in hydrocarbon solvent known under the trade mark "Shellite." This gives a positive reproduction.

EXAMPLE 7

Silicone oil is substituted for the iso-propyl alcohol of Example 6.

EXAMPLE 8

Diethylamine is substituted for the iso-propyl alcohol of Example 6.

EXAMPLE 9

For the iso-propyl alcohol of Example 6 substitute any of the following aliphatic compounds: acetic acid, dichloroethylene, acetone, nitromethane, ethyl acetate, and tributyl phosphate.

EXAMPLE 10

For the iso-propyl alcohol of Example 6 substitute an aromatic compound for instance, phenol.

EXAMPLE 11

A concentrated solution of butyric acid or lauric acid or myristic acid in mineral spirits is substituted for the iso-propyl alcohol in Example 6.

EXAMPLE 12

| | | |
|---|---|---|
| Carbon black (pigment) | grams__ | 10 |
| Butoxyethanol (coating agent) | do____ | 50 |

These two are mixed together and the excess alcohol removed by decanting or filtration. The paste is then diluted with 20 grams of a 50/50 by volume mixture of n-heptane and perchloroethylene (carrier liquid).

Then 5 grams of a 50% solution of rubber latex in benzene (fixing agent) are dissolved in 100 ml. of the same n-heptane perchloroethylene mixture and 5 grams of the diluted carbon black paste are added with vigorous stirring. The resultant developer gives positive, fixed, clear background reproduction of both line and tone subjects.

EXAMPLE 13

Metallic soaps of naphthenic acid or sulfonated derivatives of fatty acids are substituted for the butoxyethanol in Example 12.

EXAMPLE 14

Oleic acid is substituted for the butoxyethanol in Example 12.

EXAMPLE 15

The butoxyethanol of Example 12 is replaced with a 5% solution of hydrochloric acid in water.

EXAMPLE 16

| | | |
|---|---|---|
| Carbon black | grams__ | 10 |
| Water | do____ | 50 |

The two are mixed together and the excess water removed by filtration, and the resultant paste is diluted with 20 ml. tetrahydronaphthalene.

Lithographic varnish, (such as Sherwin Williams XOL8) is dissolved in carrier liquid, in the proportions of 2 grams varnish to 100 ml. 50/50 n-heptane/perchlorethylene, and 2 grams carbon black paste are added. The resultant developer gives a positive reproduction.

I claim:

1. A method of producing a liquid electrophotographic toner comprising the steps of coating pigment particles with a coating agent selected from the group consisting of:

| Coating agent | Fixing medium |
|---|---|
| Cumene | Polymerised linseed oil. |
| Tetrahydronaphthaline | do. |
| Dipentene | do. |
| Isopropyl alcohol | Polystyrene. |
| Isopropyl alcohol | Polymerised linseed oil. |
| Silicone oil | do. |
| Diethylamine | do. |
| Acetic acid | do. |
| Acetone | do. |
| Ethyl acetate | do. |
| Tributyl phosphate | do. |
| Phenol | do. |
| Lauric acid in mineral spirits solvent | do. |
| Myristic acid in mineral spirits solvent | do. |
| Butoxyethanol | Rubber later in benzene. |
| Oleic acid | do. |
| Hydrochloric acid (5%) in water | do. |
| Cumene | Petroleum jelly. | dissolving a fixing medium in a carrier liquid of high electrical volume resistivity, said carrier liquid beng selected from the roup consisting of the aliphatic hydrocarbons hexane, heptane and octane, the chlorinated hydrocarbons perchlorethylene and carbon tetrachloride, and the aromatic hydrocarbons benzene and toluene, and then suspending the coated pigment particles in the said carrier liquid whereby the said fixing medium is drawn around the pigment particles by said coating agent to leave the carrier liquid relatively free of the fixing medium.

2. A method of producing a liquid electrophotographic toner comprising the steps of coating pigment particles with a liquid polar coating agent in a quantity to produce a paste, said coating agent being selected from the group consisting of:

| Coating agent | Fixing medium |
|---|---|
| Cumene | Polymerised linseed oil. |
| Tetrahydronaphthaline | do. |
| Dipentene | do. |
| Isopropyl alcohol | Polystyrene. |
| Isopropyl alcohol | Polymerised linseed oil. |
| Silicone oil | do. |
| Diethylamine | do. |
| Acetic acid | do. |
| Acetone | do. |
| Ethyl acetate | do. |
| Tributyl phosphate | do. |
| Phenol | do. |
| Lauric acid in mineral spirits solvent | do. |
| Myristic acid in mineral spirits solvent | do. |
| Butoxyethanol | Rubber later in benzene. |
| Oleic acid | do. |
| Hydrochloric acid (5%) in water | do. |
| Cumene | Petroleum jelly. | removing any free coating agent, dissolving a fixing medium in a carrier liquid of high electrical volume resistivity, said carrier liquid being selected from the group consisting of the aliphatic hydrocarbons hexane, heptane and octane, the chlorinated hydrocarbons perchlorethylene and carbon tetrachloride, and the aromatic hydrocarbons benzene and toluene, and then suspending the coated pigment particles in the said carrier liquid whereby the said fixing medium is drawn around the pigment particles by the coating agent to leave the carrier liquid relatively free of the liquid fixing medium.

3. An electrophotographic toner composition for developing a latent charged image and comprising an electrically insulating carrier liquid, said carrier liquid being selected from the group consisting of the aliphatic hydrocarbons hexane, heptane and octane, the chlorinated hydrocarbons perchlorethylene and carbon tetrachloride, and the aromatic hydrocarbons benzene and toluene, a particulate coloring material freely suspended in said carrier liquid and adapted to be bonded to the charged image by a fixing agent, a coating agent of which substantially the entire content is pre-coated on and adhered to said coloring particles and adapted to adsorb the fixing agent, and a fixing medium dissolved in said carrier liquid and of which substantially the entire content is adsorbed as an exterior coating on said coating agent, whereby the fixing medium is in solution but is attracted to and held on said coloring particles substantially in its entirety, whereby the carrier liquid is substantially free of fixing medium unattached to the coloring particles and the electric character of the composition does not undergo substantial deterioration over prolonged periods of time, and wherein the coating agent and fixing medium are selected from the group consisting of:

| Coating agent | Fixing medium |
|---|---|
| Cumene | Polymerised linseed oil. |
| Tetrahydronaphthaline | do. |
| Dipentene | do. |
| Isopropyl alcohol | Polystyrene. |
| Isopropyl alcohol | Polymerised linseed oil. |
| Silicone oil | do. |
| Diethylamine | do. |
| Acetic acid | do. |
| Acetone | do. |
| Ethyl acetate | do. |
| Tributyl phosphate | do. |
| Phenol | do. |
| Lauric acid in mineral spirits solvent | do. |
| Myristic acid in mineral spirits solvent | do. |
| Butoxyethanol | Rubber later in benzene. |
| Oleic acid | do. |
| Hydrochloric acid (5%) in water | do. |
| Cumene | Petroleum jelly. |

References Cited

UNITED STATES PATENTS 3,076,722   2/1963   Greig _____ 252—62.1
3,150,976   9/1964   Johnson _____ 252—62.1

LEON D. ROSDOL, *Primary Examiner.*

J. D. WELSH, *Assistant Examiner.*

U.S. Cl. X.R.

106—20, 27, 30, 32, 308; 117—37; 260—33.6